US 7,900,239 B2

(12) United States Patent
Van Someren

(10) Patent No.: US 7,900,239 B2
(45) Date of Patent: Mar. 1, 2011

(54) CONTROLLING ACCESS TO A RESOURCE BY A PROGRAM USING A DIGITAL SIGNATURE

(75) Inventor: Nicko Van Someren, Cambridge (GB)

(73) Assignee: nCipher Corporation Ltd. (GB)

( * ) Notice: Subject to any disclaimer, the term of this patent is extended or adjusted under 35 U.S.C. 154(b) by 784 days.

(21) Appl. No.: 10/204,645

(22) PCT Filed: Feb. 20, 2001

(86) PCT No.: PCT/GB01/00688

§ 371 (c)(1),
(2), (4) Date: Oct. 15, 2002

(87) PCT Pub. No.: WO01/63385

PCT Pub. Date: Aug. 30, 2001

(65) Prior Publication Data

US 2005/0005112 A1    Jan. 6, 2005

(30) Foreign Application Priority Data

Feb. 21, 2000   (GB) .................................. 0003920.6

(51) Int. Cl.
*G06F 17/00* (2006.01)
(52) U.S. Cl. ................................ 726/1; 726/10; 726/26; 726/27; 713/176
(58) Field of Classification Search ................. 713/176; 726/1, 10, 26, 27
See application file for complete search history.

(56) References Cited

U.S. PATENT DOCUMENTS

| 5,337,360 A | 8/1994 | Fischer .......................... 380/23 |
| 6,138,235 A * | 10/2000 | Lipkin et al. ................. 713/155 |
| 6,904,523 B2 * | 6/2005 | Bialick et al. ................ 713/156 |

FOREIGN PATENT DOCUMENTS

| EP | 0 969 366 A1 | 1/2000 |
| WO | WO 98 19237 | 5/1998 |

OTHER PUBLICATIONS

Gong et al., Going Beyond the Sandbox: An Overview of the New Security Architecture in the Java Development Kit 1.2, Dec. 1997, USENIX Symposium on Internet Technology and Systems, pp. 103-112.*
International Search Report dated Jun. 15, 2001.

* cited by examiner

*Primary Examiner* — Jacob Lipman
(74) *Attorney, Agent, or Firm* — Young & Basile

(57) ABSTRACT

A computer system has a resource, a verification unit and an execution engine for running a body of program code having an associated signature. A cryptographic key is associated with the resource and when the code is to be loaded into the execution engine a verification operation is run on the signature using the cryptographic key associated with the resource. The execution engine is separate from the resource and when access to the resource is required by the code in the execution engine a further verification operation is conducted on the signature using the cryptographic key associated with the resource. Access to the resource by the code depends upon the result of the verification operation.

16 Claims, 7 Drawing Sheets

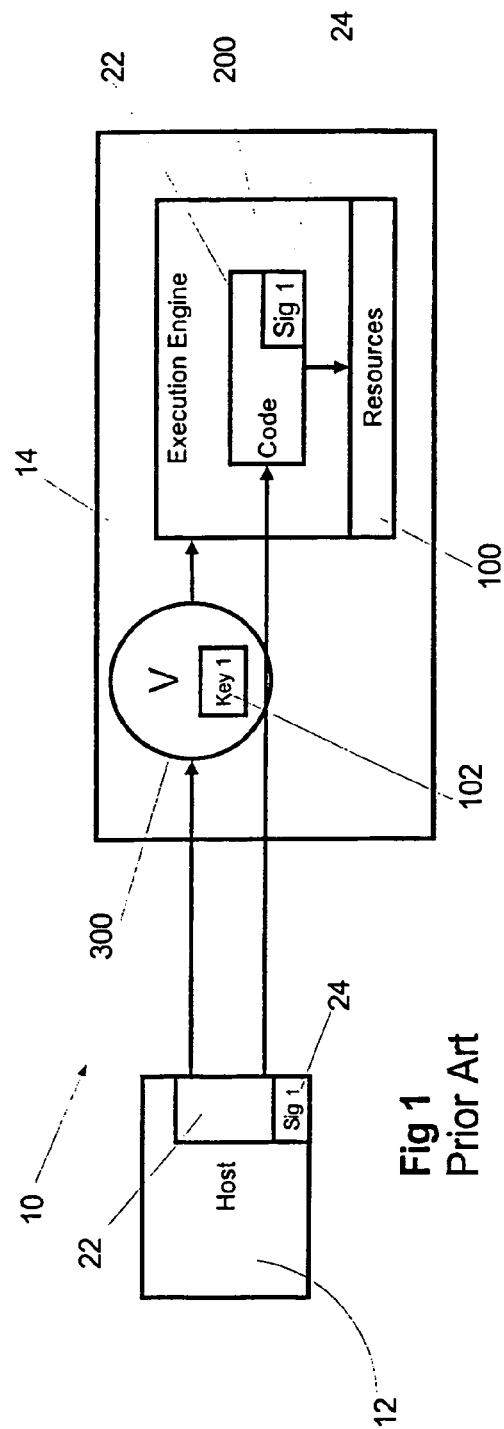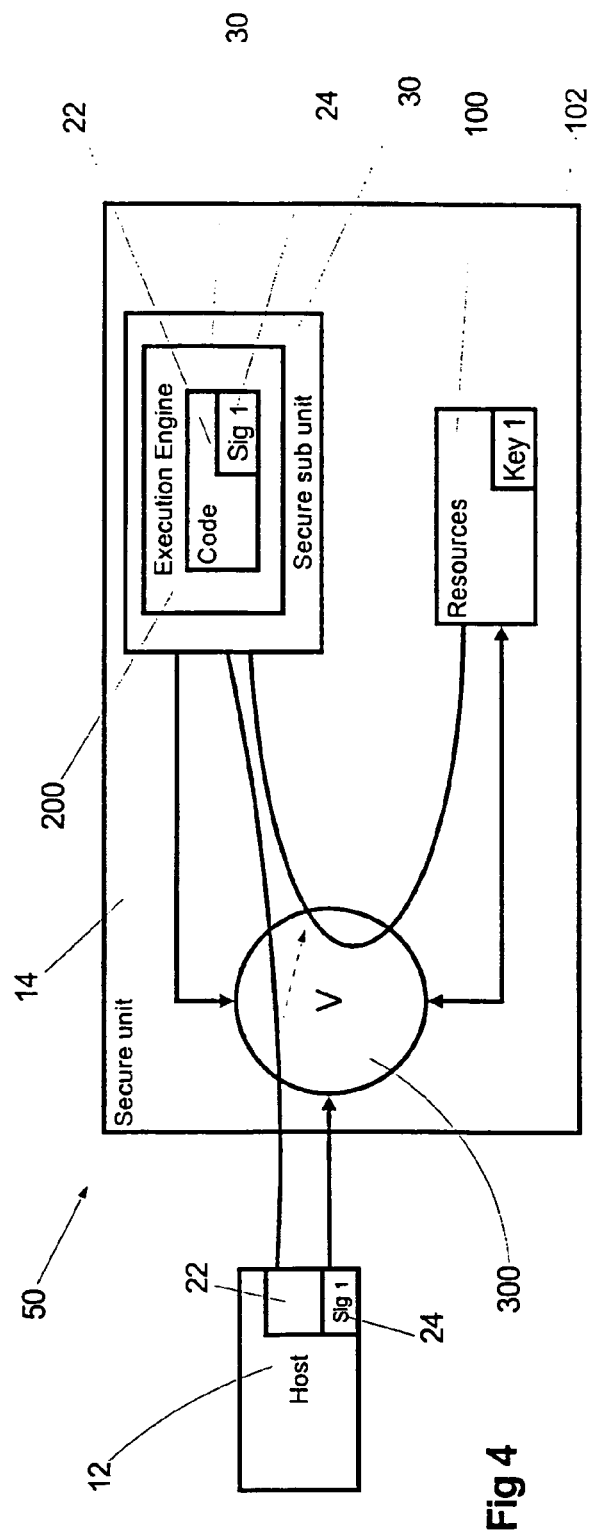
Fig 1
Prior Art
Fig 4

CONTROLLING ACCESS TO A RESOURCE BY A PROGRAM USING A DIGITAL SIGNATURE

The present invention relates to a computer system and particularly, but not exclusively, to a so-called secure computer system.

In many computer systems, it is necessary to control access to certain resources, such as areas of computer memory, cryptographic keys or other sensitive data. This might be because they contain secret information, because the resource is scarce, because the resource has intrinsic value or a combination of factors. In such systems it may be necessary to allow some parties access to the resources while denying access to other parties.

There are a number of existing systems which are designed to enforce access control to such resources. There are, however, other more demanding systems where simply controlling who can access the resource is not sufficient. In these systems it may also be necessary to control what is done with the resource.

The present invention aims to provide an improved method for securing a resource on a computer system and an improved computer system.

Accordingly, the present invention provides a method of controlling access to a resource in a computer system by a body of code having a signature associated therewith, the method comprising the steps of providing a cryptographic key associated with said resource, conducting a verification operation on said signature using the cryptographic key associated with said resource and controlling access to the resource by the code in dependence upon the result of said verification operation.

The present invention also provides a computer system comprising verification means for verifying a digital signature associated with a body of program code and a resource having a cryptographic key associated therewith wherein said verification means is operable to use said cryptographic key to verify said digital signature thereby to allow access of the code to said resource in dependence upon the verification.

The invention provides a novel system for controlling, on a fine grained basis, what can be done with a resource. In our system the actions will be carried out by a computer program and our invention allows various resources to specify which parties may perform which actions.

The present invention will now be described, by way of example only, with reference to the accompanying drawings in which:

FIG. 1 is a diagrammatic representation of a conventional secure computer system;

FIG. 4 is a diagrammatic representation of a secure computer system according to the present invention;

In the drawings like parts are given like reference numbers.

Figure 2:
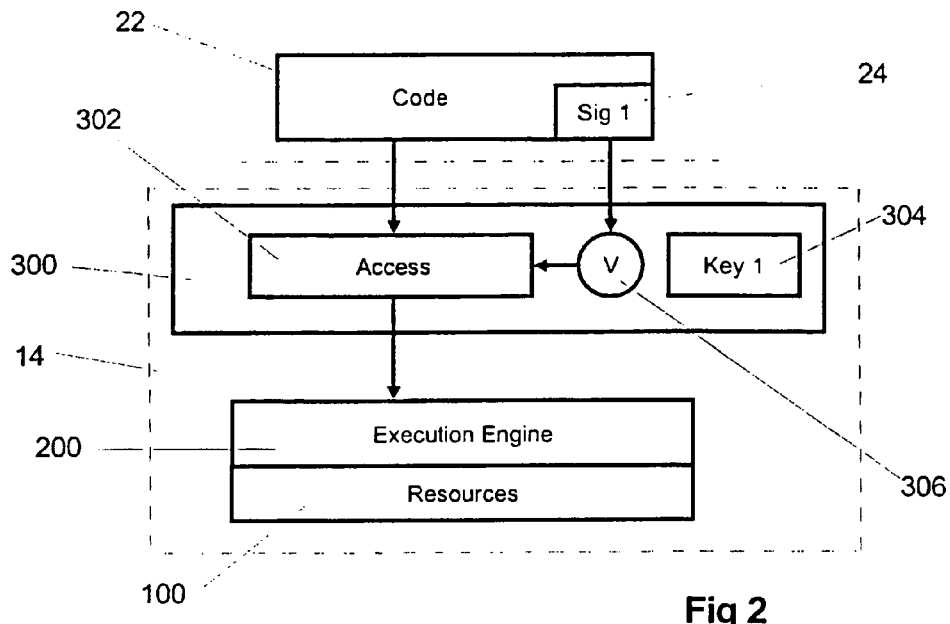
FIG. 2 is a representation of the operation of the system of FIG. 1.

FIG. 1 is a representation of a hardware computing system 10 which allows a user access to a sensitive or restricted resource. The system has a host computer 12 connected to a secure module 14 which may be a card in the computer 10 or a separate and remote unit. The secure module 14 contains the resource 100, an execution engine 200 and an access control unit 300. The system 10 may constitute, for example, a main frame or server PC of a business such as a bank which may be accessed internally or by way of an on-line access, e.g. by a customer. The execution engine 200 is code which is running in the secure module 14 and has access to the security sensitive resource 100 which typically may be bank account data stored in Random Access Memory (RAM).

In use, when a third party attempts to gain access to the resource 100 via the host computer 12 the latter applies a computer program code 22 to the execution engine 200 to gain access to the resource 100. The code 22 to be executed has a digital "signature" 24, in the form of a unique code, encoded either within the program code 22 or presented alongside the program code. The signature is indicated as Sig 1 to show that it is specific to a particular individual or group of individuals referred to here as the primary owner. Before the code is loaded into the execution engine 200 the signature is verified in the access control unit 300 using a cryptographic key (Key 1) and only if the verification is positive is the code allowed to load into the execution engine to give the third party access to the resource 100.

FIG. 2 is a representation of the operation of the system software and shows the program code 22 and associated digital signature 24 in the host computer 12, and the resource 100, execution engine 200 and access control unit 300 in the secure module 14. The access control unit 300 includes an access control device 302 which controls access to the resource 100.

In use, the program code 22 to be executed by the execution engine 200 is applied to the access control unit 300. As indicated above, the code 22 to be executed has a digital "signature" 24, in the form of a unique code, encoded either within the program or presented alongside the program. The access control unit 300 contains a cryptographic key 304 (Key 1), which may be referred to as the primary key, and a signature verifier 306 in the form of a comparator operable to check the signature 24 associated with the code. The cryptographic key 304 is set by the manufacturer of the secure module 14. The signature verifier 306 checks the signature 24 using the cryptographic key 304 in the access control unit 300. Providing the signature 24 on the code is correct, the access control unit 300 allows the code to be loaded into the execution engine 200 where it can be run and gain access to the resource.

Thus, the verification of the signature relies upon key 304 that is built into the access control unit 300 by the module manufacturer and it is the loading of the code 22 into the execution engine 200 which is controlled by the verification process.

Figure 3:
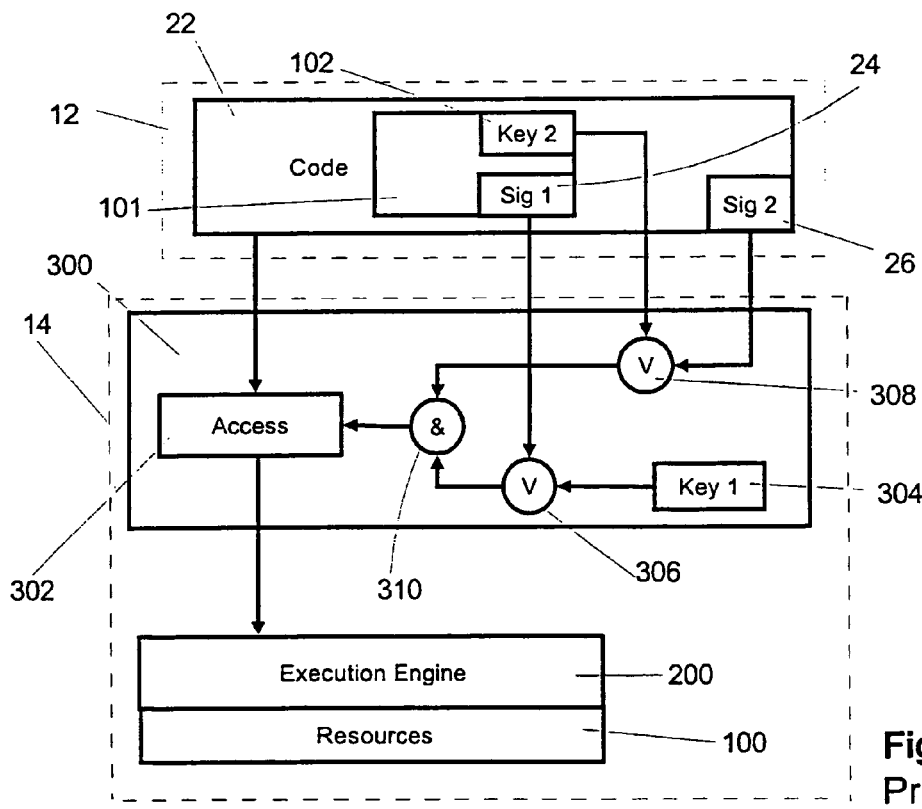
FIG. 3 is a representation of a second known computer system.

FIG. 3 shows a conventional variant of the system of FIG. 2 where the primary owner wishes to delegate access to the resource 100 to another party. The code 22 contains a delegation certificate 101 consisting of a further cryptographic key 42 (Key 2) and the signature 24 of the primary owner, possibly accompanied by other data. The code also contains a new signature 26 (Sig 2) for the other party, referred to here as the secondary owner, to whom the primary owner of the first signature 24 wishes to delegate access to the resource. In this system the key 304 (Key 1) built into the access control unit 300 uses the verifier 306 to verify the signature 24 of the primary owner on the certificate 101 while a second verifier 308 checks the second signature 26 of the secondary owner on the code against the key 42 of the primary owner in the certificate 101. The outputs of the two verifiers are taken together using an "and" operation 310 and only if the first signature AND the second signature are verified is the secondary owner allowed access to the resource 100 by the access control device 300.

A common property of these conventional systems is that ultimately the verification of the signature, or the chain of delegation certificates, ends with a key that is built into the system. It is up to the owner of the system which keys are to be trusted for which operations.

FIG. 4 is a representation similar to that of FIG. 1 of a preferred form of hardware computer system 50 according to the invention. In FIG. 4, the secure module 14 contains a secure sub unit 30 in which the execution engine 200 is located. The access control unit 300 and the resource 100 are separated from the execution engine 200 within the module 14 so that the execution engine 200 operates within the secure sub-unit 30. The separation of these devices may be physical, by means of controlling the electrical and mechanical connections between the devices, or through logical separation in the operation of software components within the computer system. The resource 100 also contains a cryptographic key 102 (Key 1) which is the primary key and is similar to key 304 of FIGS. 2 and 3. However, the key 102 is set by the owner of the resource 100 and not by the manufacturer of the module 14. It will be appreciated that, as mentioned above, although 14 is referred to as a module it may be in the form of a card contained within the host computer 12 or may be one or more discrete units physically separate from the host computer 12.

The host computer 12 may communicate with the execution engine 200 only through the access control unit. As shown in FIG. 4, any code operating within the secure sub-unit 30 is unable to access any resource outside the secure sub-unit 30 other than by issuing a request through the access control unit 300.

When the host system 10 attempts to load the program code 22, together with its associated authentication signature 24, into the execution engine 200, this code is first passed through the access control unit 300 which checks that the signature 24 associated with the code 22 is a valid signature using the key 102. At this point, the access control unit 300 does not associate this signature with any authority to access the resource 100. However, the access control unit 300 records the identity of the signature creator and associates this with the program code 22 that has been loaded. When the program code 22 is subsequently executed by the execution engine 200 within the sub-unit 30, the code may request access to the resource 100 and the request is passed through the access control unit 300. The identity recorded against the code at the time that it was loaded is then checked by the access control unit 300 using an access control policy to ascertain what actions, if any, are authorised by the signature 24. Only those authorised actions are allowed to be carried out on the resource 100.

Figure 5:
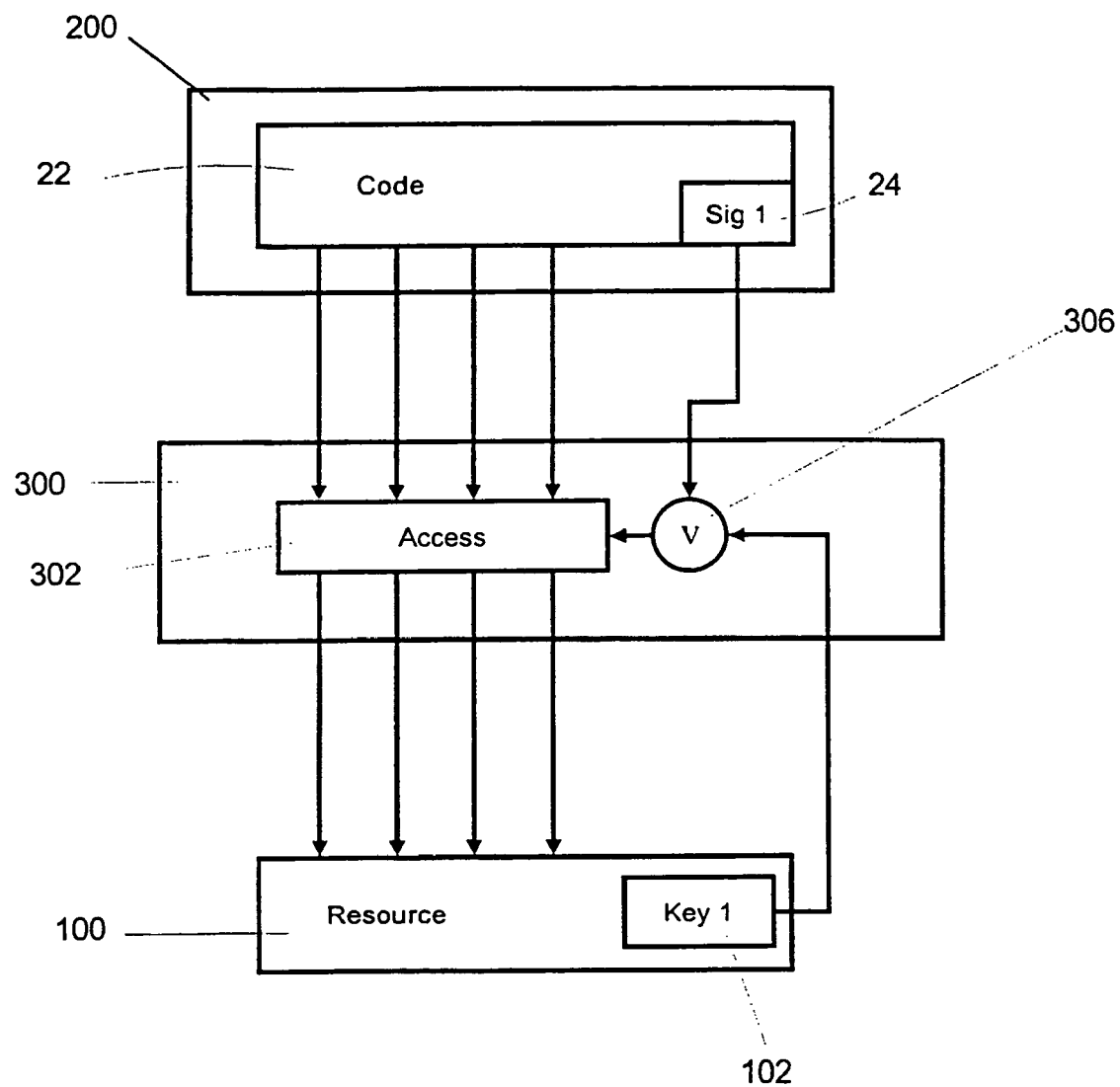
FIG. 5 is a representation of the operation of the system of FIG. 4.

FIG. 5 is similar to FIG. 2 and is a representation of the operation of the system software within the module 14.

In the system of FIG. 5, the resource has associated with it the cryptographic key 102 which may be used to verify the digital signature 24 associated with the body of program code 22. The program code, along with its associated digital signature 24 is first loaded into the module 14 where the access control block 300 compares the signature with the key 102 associated with the resource 100. The access control unit 300 includes access control device 302 which controls access to the resource 100, and signature verifier 306. If the signature is correctly verified then the code is allowed to load in the execution engine 200 but still does not have access to the resource 100 and the access control unit 300 records the identity of the signature creator and associates this with the program code 22 that has been loaded.

If the user then requires access to the resource 100 to carry out a particular operation, the code 22 is run in the execution engine 200 and requests access to the resource 100. This access has to be effected through the access control unit 300 and at this stage the signature 24 is checked against the access control policy.

In its simplest form in FIG. 5 the signature 24 is verified against the key 102 by the verifier 306 and if verified access is allowed to the resource 100. Thus, it is the resource itself that determines which code is allowed access to the resource because the key 102 is in the resource and not the module 100. This means that each user can set his own key in his own data block in the resource 100 and this is not therefore accessible by whoever has access to the module 14.

In variants of this invention more than one signature can be applied to the program code using different cryptographic keys. In this case access to the resource will be granted if any of the signatures verify against any of the listed keys given with the resource. The signature on the program code may be replaced by a signature on a cryptographic hash of the program code, a signature on a set of hashes of parts of the program code, on a hash or hashes of the parts of the program code or on any other method which allows the verification of the signature to be completed only if the code is identical to the code upon which the signature was originally placed, since the signature is unique to the code.

The keys associated with the resource may be replaced by cryptographic hashes of those keys or other identifiers of the keys which allow the device uniquely to identify the correct keys with which to verify the signature. In these cases the real signature verification keys must be available to the device in order to carry out the verification process.

In this invention the signature can be any form of digital or electronic signature which can be verified by the device.

Figure 6:
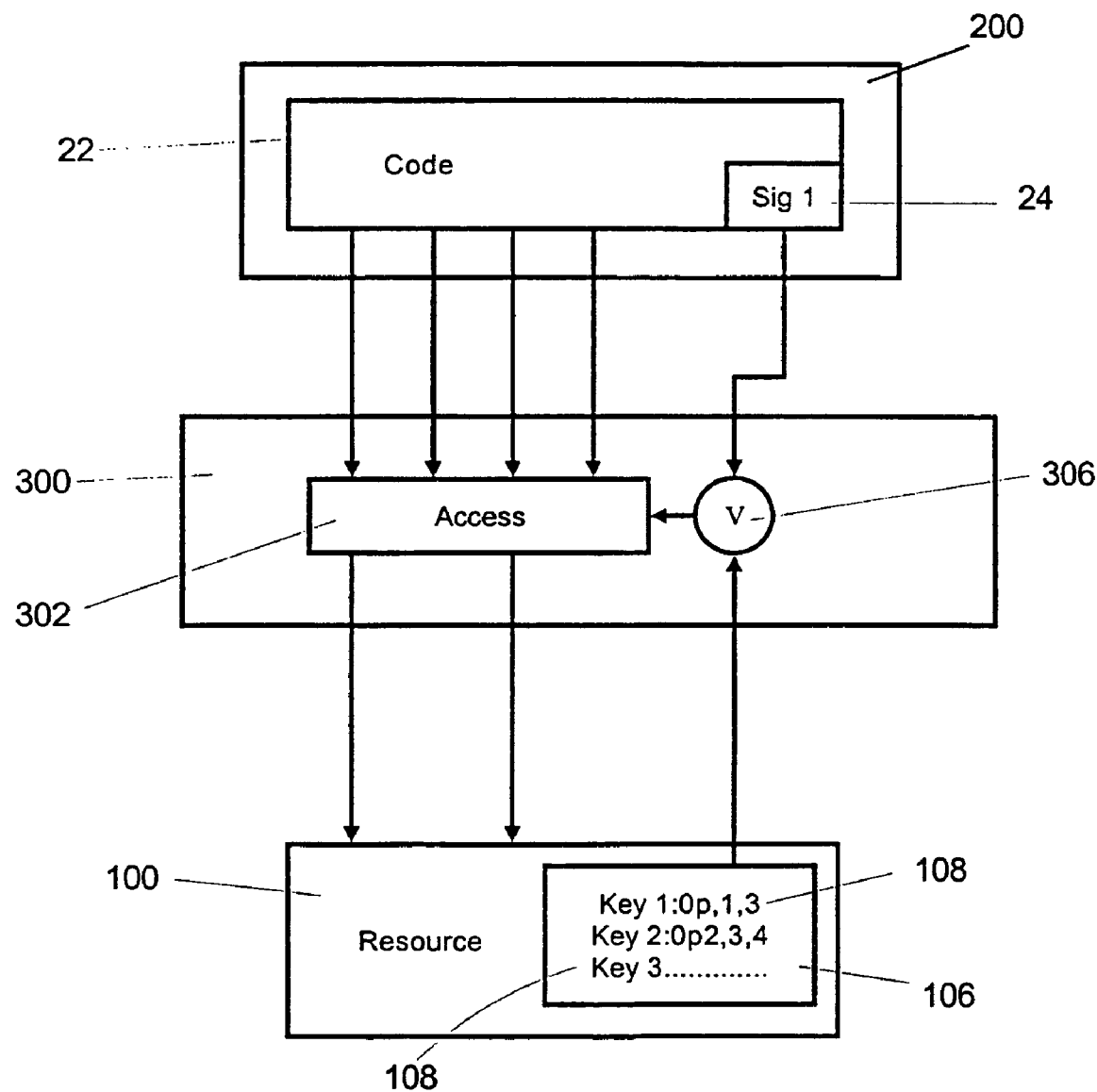
FIG. 6 is a representation similar to that of FIG. 5 of the operation of a modification to the system of FIG. 5.

The system of FIG. 5 does not restrict the actions which the signature holder might carry out on the resource 100 once the code is allowed access to the resource 100 by the access control unit 300, since the key does not have any access restrictions associated with it. FIG. 6 shows a system in which the actions are restricted to those allowed by the associated key. In this system, the resource 100 has associated with it an access control list (ACL) 106 comprising key sets 108. Each set 108 indicates some actions which may be performed using the resource, some key which may be used to authorise those actions and, optionally, some constraints upon those actions including time limits, usage limits, parameter limits or other constraints. As before, the resource is made available to the execution engine 200 but this time it is bound to the access control lists rather than simply to keys. The program code 22 is loaded into the execution engine 200 as before along with the signature 24 upon the code. The code may then be executed inside the execution engine 200 and when the code attempts to carry out any operation upon the resource the access control list 106 is checked. If the signature on the code can be verified by the verification unit 306 with respect to one of the keys in the ACL the access control unit 300 allows the code access to the operations listed in the ACL entry which has the correct key, providing the access falls within any given constraints. Otherwise the actions are not permitted. For example, one access key may allow the user read only rights to data in the resource whilst another might allow read/write access. Another possibility where the resource is memory is for different keys to allow access to different parts of memory.

Figure 7:
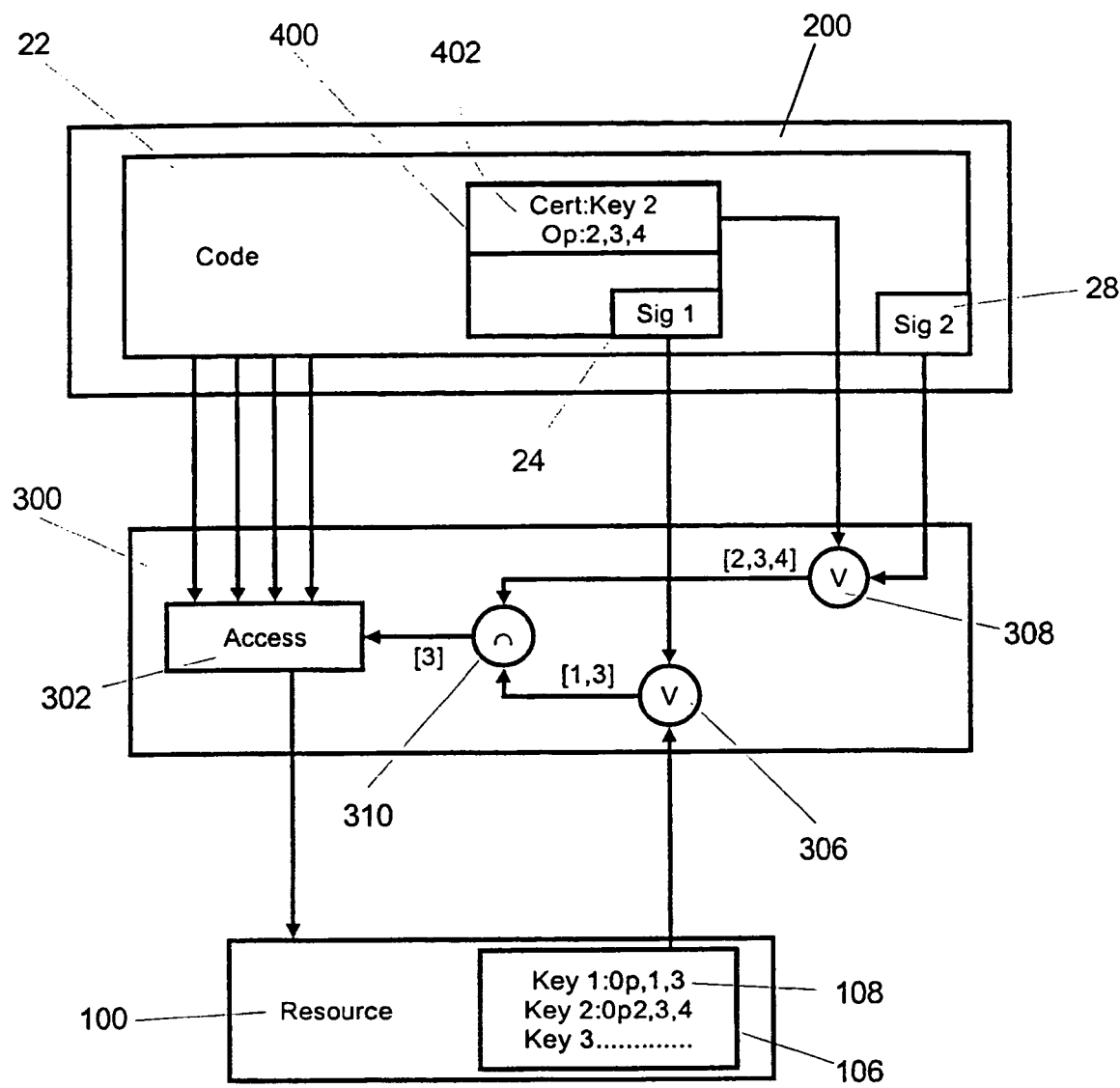
FIG. 7 is a representation similar to that of FIG. 5 of the operation of a second modification to the system of FIG. 5.

In a third version of the invention (FIG. 7) intermediate access control lists may be used to delegate control. The code 22 contains a delegation certificate 400 consisting of a further cryptographic key 402 (Key 3) and the signature 24 of the primary owner. The code also contains a new signature 28 (Sig 2) for the secondary owner, to whom the primary owner of the first signature 24 wishes to delegate access to the resource 100. As in the embodiment of FIG. 6 the use of the resource 100, or individual operations on the resource, is associated with signature verification keys 108 of access control list 106. However, in this system delegation credentials may be constructed in the following manner: an access control list 402 in the delegation certificate 400 is built in a similar form to the list 106 associated with the resources. This list 402 is then signed using the cryptographic signature key 24. The resource 100 is made available to the execution engine 200, along with its access control list 106, and the program code 22, its signature 28, and the delegation credential 400, including its signature 24 are all loaded into the execution engine 200. The signatures on the code can be checked by verification unit 308 against the keys in delegation credential 400 and the signature 24 on the delegation credential is verified against the keys 108 in the resource's access control list 106 using verification unit 306. The intersection is taken at 310 of the operations listed in validated ACL entries and validated delegation credentials. Access is granted by access control device 302 to the code for operations that fall within this intersection of operations.

It will be appreciated, therefore, that one user with rights to one part of the resource 100 can sign off or delegate part or all of those rights to a third party. Referring again to FIG. 7, the output of verifier 308 shows operations identified as [2, 3, 4] being allowed by the verification check of the secondary owner's signature 28 against the delegation key 402, for that signature, of the code access control list 400. However, the output of verifier 306 shows only operations identified as [1, 3] being allowed by the verification check of the primary owner's signature 24 against the delegation key 108 in the resource access control list 106 for that signature. Thus, the secondary owner is only allowed to carry out operation [3] on the resource 100.

In a fourth variant of this invention (FIG. 8) access can be granted to all code which is authorised under the system shown in FIG. 6 as well as code authorised as described above in relation to FIG. 7. Multiple levels of delegation may be permitted in which the operation must be listed in each ACL with a key which verifies the signature on the next credential, or which verifies the program code in the last credential.

Figure 8:
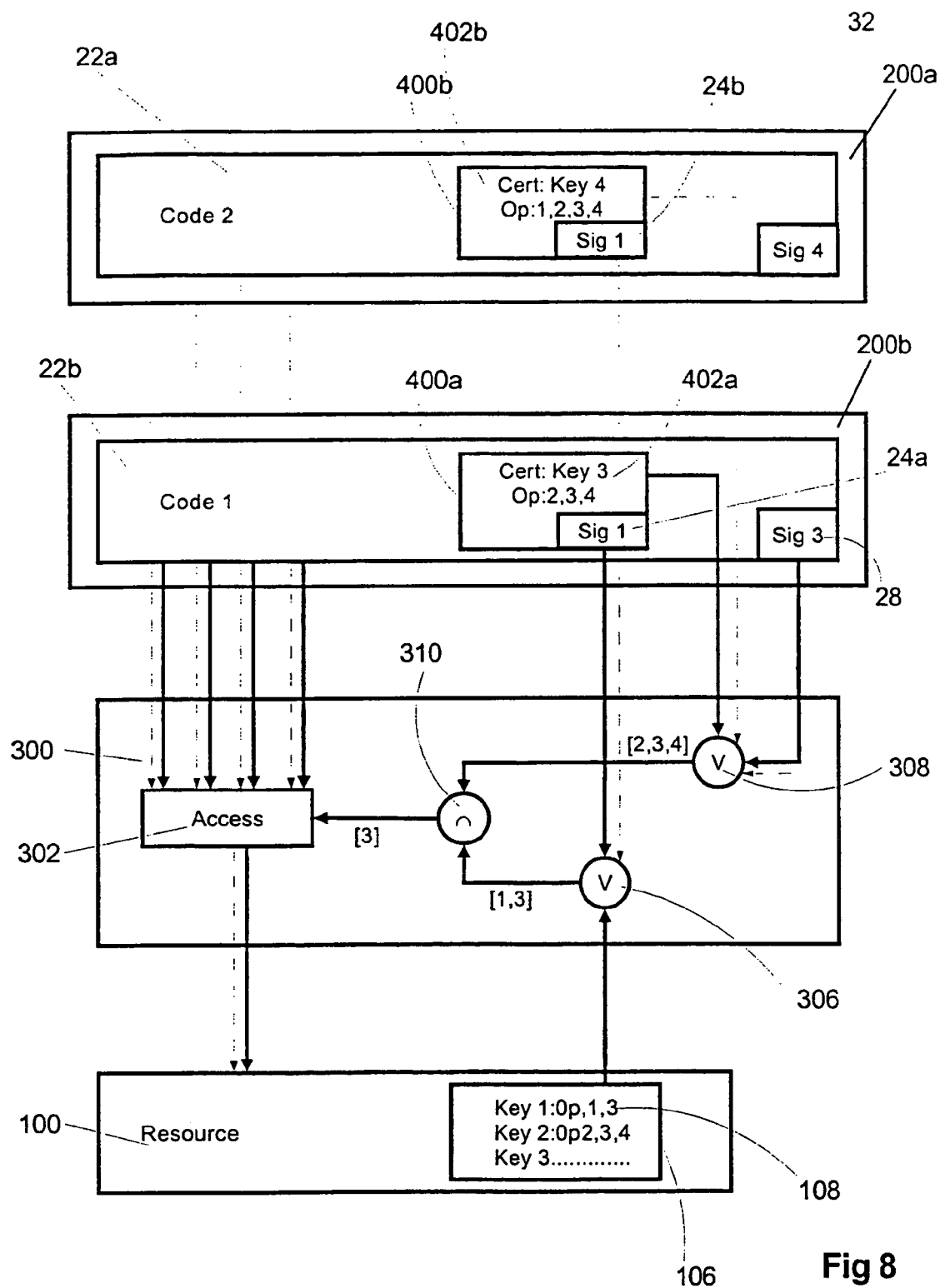
FIG. 8 is a representation similar to that of FIG. 5 of the operation of a third modification to the system of FIG. 5.

As shown in FIG. 8 this scheme can be used to allow multiple bodies of code 22a, 22b to have differing levels of access to the same resource 100 by having different delegation certificates 400a, 400b and signatures 24a, 24b, 28, 32.

The codes 22a, 22b are loaded into different execution engines 200a, 200b within the secure module 14. It will be appreciated that the different execution engines 200a, 200b, as well as individual resources, may be in different secure sub units within the secure module 14 and cannot therefore interfere with one another.

Figure 9:
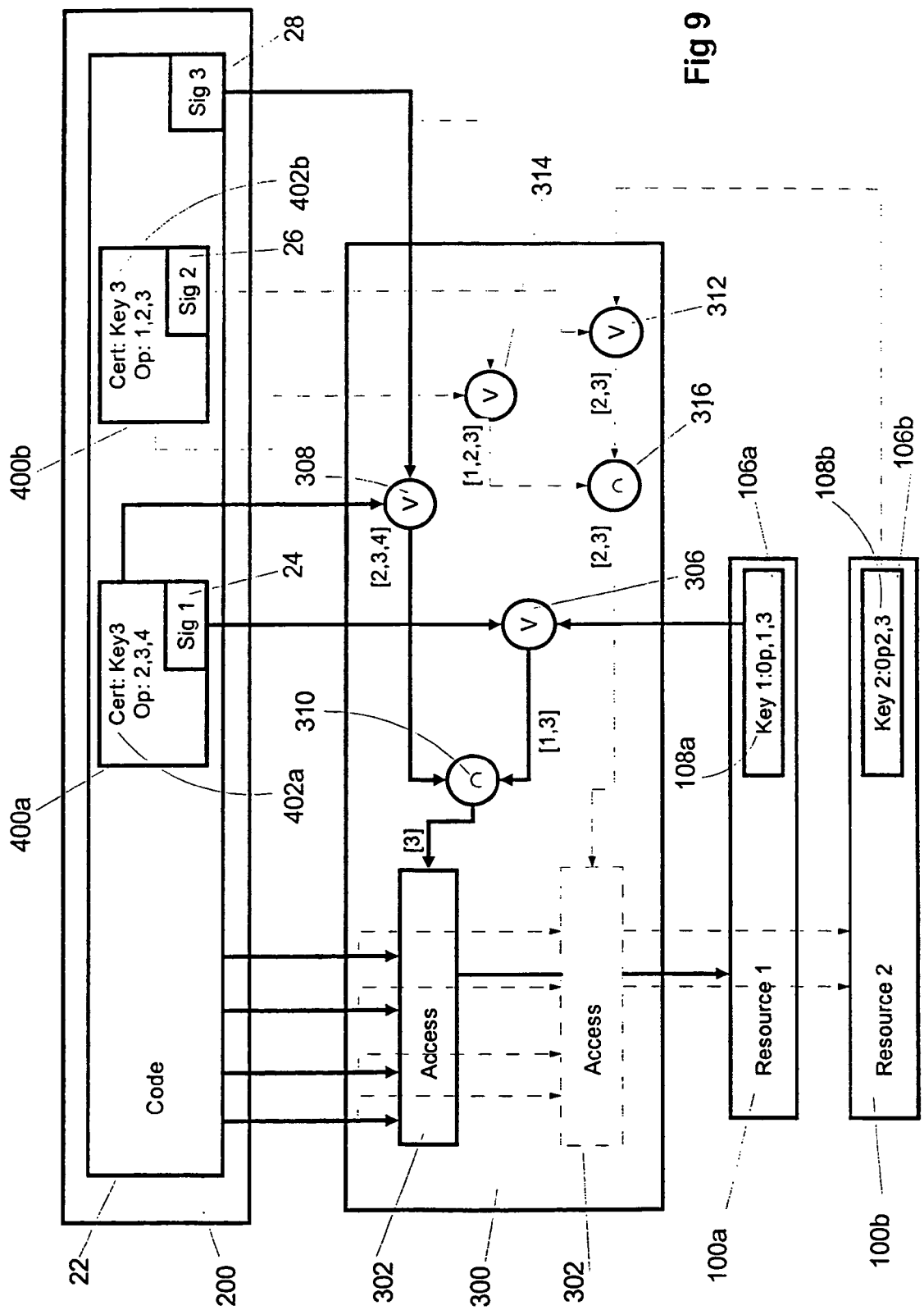
FIG. 9 is a representation similar to that of FIG. 5 of the operation of a fourth modification to the system of FIG. 5.

In a further modification (FIG. 9) the system of FIG. 8 can be used to allow one body of code 22 different levels of access to more than one resource 100a, 100b. The code 22 is similar to code 22a or 22b of FIG. 8 but has two or more delegation certificates 400a, 400b, each with a cryptographic key 402a, 402b and signature 24, 26. Here there are two primary owners of signatures 24, 26 who both wish to delegate to the same user or secondary owner of signature 28. The secondary user is granted different rights to the two resources 100a, 100b in dependence on the delegation credentials. The access control unit of FIG. 9 can perform the verification for both primary signatures 24, 26 and the secondary signature 28 at the same time as is indicated by the broken lines. In the example of FIG. 9, the secondary user is allowed by the ACLs of the delegation certificate 400a of primary owner of signature 1 to carry out operation [3] where the resource 100a, 100b allows according to its own ACL whilst the secondary user is allowed by the ACLs of the delegation certificate 400b of primary owner of signature 2 to carry out operations [2, 3] where the resource 100a, 100b allows.

In a further modification of the system, which may be combined with previous versions, the access control lists either attached to the resources or used in the delegation certificates can specify that any further delegation certificate must contain a "challenge" value. In this system when accessed by the code the access control unit 300 returns a "challenge" value which is unlikely to be guessed usually because the number is large and appears to be random. The access control unit 300 keeps a record of all the challenges that have been issued, along with information about the how long the challenge value is considered to be valid. For the code to be allowed access to operations permitted by an ACL entry requiring a challenge it must have a certificate that includes a currently valid challenge and this must be correctly signed. By controlling the lifetime of the challenge the system can control the lifetime of certificates used by the code. This can be used to grant temporary access rights to a body of code.

The differences between known systems and the system of the present invention will clearly be understood from the foregoing. In particular, in known systems, the code once authorised can access any available resource and the system requires the secure unit to protect the code, the resources and the checking process from hostile external attacks. In contrast, in the system of the present invention, the authorisation is contained in the resource access rather than the loading of the code and the secure sub-unit 180 not only protects the code, resources and the checking process from hostile external attacks but also protects the resources and checking processes from attacks from hostile code already loaded in the execution engine 200. This extra protection is necessary owing to the delayed nature of the authorisation of accesses to the resources.

It will be appreciated that the code, once loaded in the secure sub-unit 180, can perform any operation within the sub-unit including altering the code itself, since the authenticity of the code is checked before execution begins. It will also be appreciated that the present invention is more efficient than systems where the code is authenticated each time an access to the resources is made since the signature on the code need only be validated once.

In cases where more than one signature is applied to the code before it is loaded, all of the signatures are verified as the code is loaded and the identities of all the code signors are recorded. When an access to a resource is made, either the verification device can allow the access if any of the signors would have the right to make the access or, alternatively, the code might indicate in the request the identity whose credentials should be used for the authorisation.

In all of the systems represented in the drawings, various resources are required to be accessed by particular blocks of computer program code. The programs may be general purpose programs which make use of the various resources. An aim of the invention is to control the access to the resources so that only authorised programs may access the resources in authorised ways or cryptographic keys which may be accessed by selected users.

It is up to the owner of the computer system to determine which keys are to be trusted for which operations. Consequently, if further resources are added to the computer system, further keys must be added to the access control unit 300.

The invention claimed is:

1. A method for controlling access by a body of code to a resource including at least one of an area of computer memory, a cryptographic key, or other restrictive data, the resources held within and managed by a secure computer system, the method comprising the steps of:
   (i) attaching a signature to said code after compilation of said code, the signature being unique to the code;
   (ii) providing a cryptographic key bound to said resource by an owner of the resource;
   (iii) conducting a verification operation on said signature using the cryptographic key;
   (iv) and controlling access to the resource by the code in dependence upon a result of said verification operation;
   wherein said code has a plurality of signatures associated therewith;
   step (iii) comprises conducting a verification operation on each said signature using said cryptographic key bound to said resource;
   and step (iv) comprises allowing said code access to said resource only in response to all of said signatures being verified.

2. A method as claimed in claim 1 wherein:
   said resource has a plurality of associated keys bound thereto; and
   step (iii) comprises conducting a verification operation on each said signature using each said cryptographic key-bound to said resource.

3. A method as claimed in claim 1 wherein the key is configured to authorise preselected actions on said resource.

4. A method as claimed in claim 1 wherein:
   the key is configured to authorise preselected actions on said resource;
   and following verification of each of the signatures by a said key associated with said resource, access to said resource by said code is allowed only in relation to those preselected actions associated with said key.

5. A method as claimed in claim 1 further comprising:
   providing an execution engine separate from said resource for executing said code;
   and step (iv) further comprises loading said code into said execution engine in response to said signatures being verified.

6. A method as claimed in claim 5 further comprising:
   (v) conducting a further verification operation on said signatures using the cryptographic key-bound to said resource by its owner in response to said code in said execution engine attempting to access said resource;
   (vi) and further controlling access to the resource by the code in dependence upon the result of said verification operation.

7. A method as claimed in claim 6 wherein:
   said resource has a plurality of associated keys; and
   step (v) comprises conducting a verification operation on each said signature using each said cryptographic key-bound to said resource.

8. A method as claimed in claim 1 comprising:
   providing said code with first and second signatures;
   associating a cryptographic key for said second signature with said first signature;
   step (iii) comprises conducting a verification operation on said first signature using said cryptographic key-bound to said resource, and conducting a verification operation on said second signature using said cryptographic key associated with said first signature;
   and step (iv) comprises allowing said code access to said resource only in response to both of said signatures being verified.

9. A method as claimed in claim 8 wherein:
   one of said keys is configured to authorise preselected actions on said resource;
   and following verification of said signatures by said keys, access to said resource by said code is allowed only in relation to those preselected actions associated with said one of said keys.

10. A method as claimed in claim 8 wherein:
    each of said keys is configured to authorise preselected actions on said resource;
    and following verification of said signatures by said keys, access to said resource by said code is allowed only in relation to those preselected actions which are common to said keys.

11. A computer system comprising:
    verification means for verifying a plurality of digital signatures associated with a body of program code;
    and a resource having a cryptographic key bound thereto by an owner of the resource;
    wherein said verification means is operable to use said cryptographic key to verify each of said digital signatures to allow access of the code to said resource only in response to all of said signatures being verified.

12. A system as claimed in claim 11 further comprising an execution engine means for running said program code;
    wherein said execution engine means is separate from and is coupled to said resource by way of said verification means;
    and said verification means is operable to verify said code both prior to said code loading into said execution engine means and prior to said code accessing said resource from said execution engine means.

13. A system as claimed in claim 12 wherein said verification means, said resource and said execution engine means are contained within a secure module.

14. A method for controlling access by a body of a code to a resource comprising the steps of:
    holding the resource within a secured computer system;
    managing the resource by the secured computer system;
    providing a cryptographic key associated with the resource, the cryptographic key provided by an owner of the resource;
    providing an execution engine in the secure computer system separate from the resource;
    executing a body of code attached to a signature in the execution engine, the body of code thereby requesting access to the resource;
    controlling access to the resource by the body of code with an access control unit separate from the cryptographic key; and
    conducting a verification operation on said signature using the cryptographic key;
    wherein said access control unit denies or allows access to the resource by the code in dependence upon the result of said verification operation;
    and wherein said code has a plurality of signatures associated therewith;
    the step of conducting a verification operation comprises conducting a verification operation on each said signature using said cryptographic key associated with said resource;
    and said access control unit allows said code access to said resource only in response to all of said signatures being verified.

15. A method for controlling access by a body of code to a resource including at least one of an area of computer memory, a cryptographic key, or other restrictive data, the resource held within and managed by a secure computer system, the method comprising the steps of:
attaching a plurality of signatures to said code;
providing a cryptographic key bound to said resource by an owner of said resource;
providing an execution engine separate from said resource for executing said code;
conducting a verification operation on each said signature using said cryptographic key to verify the validity of each said signature and subsequently (a) recording the identity of a signature creator and associating this with the code and (b) loading said code into said execution engine in response to each said signature being verified;
and in response to a request by said code for access to said resource, checking the authorization level of each said signature and controlling access to the resource by the code in dependence upon the result of said authorization level check and only in response to all of said signatures being verified.

16. A computer system comprising:
verification means for verifying a plurality of digital signatures associated with a body of program code;
an execution engine means for running said program code;
and a resource having a cryptographic key bound thereto by an owner of the resource;
wherein:
said execution engine means is separate from and is coupled to said resource by way of said verification means;
said verification means is operable to use said cryptographic key to verify each of said digital signatures thereby to allow loading of the code into said execution engine means in dependence upon the verification;
and said verification means is further operable, in response to a request by said code for access to said resource, to check the authorization level of each said signature and control access to the resource by the code in dependence upon the result of said authorization level check and only in response to all of said signatures being verified.

* * * * *